May 19, 1931.  A. LYSHOLM ET AL  1,805,917
COOLER CONTACTING WITH CIRCULATING AIR
Filed Aug. 2, 1928
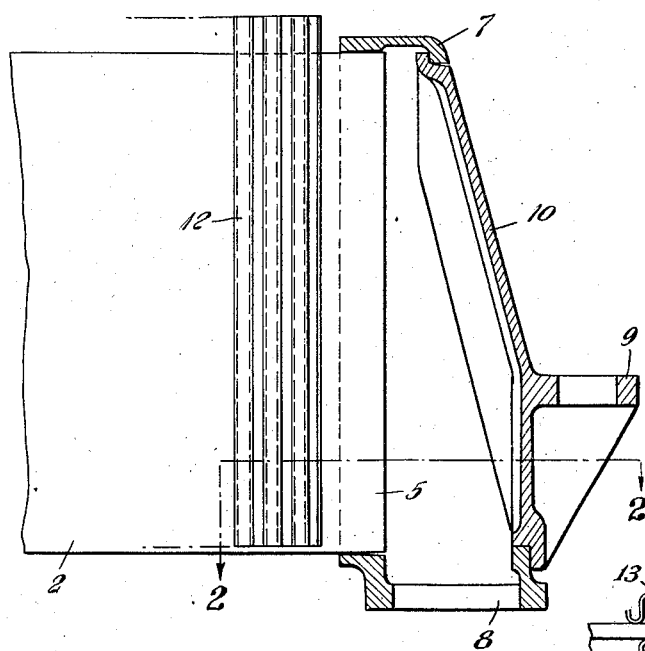
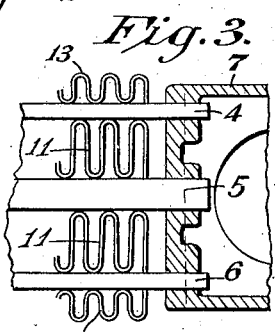
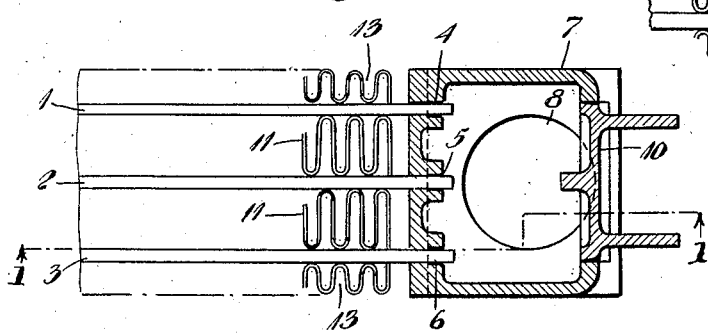
Inventors
Alf Lysholm and
Gunnar Cederstrand.
By Cameron, Kerkam and Sutton.
Attorneys.

Patented May 19, 1931

1,805,917

UNITED STATES PATENT OFFICE

ALF LYSHOLM AND GUNNAR CEDERSTRAND, OF STOCKHOLM, SWEDEN, ASSIGNORS TO AKTIEBOLAGET LJUNGSTRÖMS ÅNGTURBIN, OF STOCKHOLM, SWEDEN, A JOINT-STOCK COMPANY OF SWEDEN

COOLER CONTACTING WITH CIRCULATING AIR

Application filed August 2, 1928, Serial No. 296,906, and in Sweden August 4, 1927.

Coolers have been previously suggested, wherein the agents to be cooled down, either steam or water, are caused to flow within cooling elements in the form of flattened pipes provided on the outside with flanges in contact with circulating air. It has also been proposed to provide these flattened pipe elements disposed beside each other with projecting flanges on the outside, said flanges being, if desired, pressed out of the pipe material, the flanges on the opposed walls of two adjacent cooling elements then crossing each other. In certain cases, however, for instance in condensing locomotives, it has not been possible with cooling elements made in the manner set forth to obtain a sufficiently large surface on the air side of the cooling element in relation to the steam or water side of the same element.

The present invention refers to coolers of this type and relates to constructions, whereby this disadvantage is obviated and the capacity of the cooler is increased, counted per unit of volume.

The invention resides in the fact that the flattened pipes of which the cooler is composed are collected in groups with their ends inserted in and connected with distributing or collecting chambers for steam or water pertaining to each group of pipes, the said pipes or some of them being provided on the outside with corrugated plates, or with plates fashioned in some other suitable manner, said plates being secured on the flat surfaces of the pipes, which pipes are at right angles to a common plane extending through their center lines.

The invention will be described more closely in connection with the accompanying drawings, in which Fig. 1 is a longitudinal section through a group of flattened pipes on line 1—1 in Fig. 2, which latter figure shows a section through the same group of pipes on line 2—2 in Fig. 1.

1, 2 and 3 denote three flattened pipes pertaining to the same group and being inserted at the one end, as at 4, 5 and 6, into a distributing chamber 7, in which they are secured. This chamber distributes the steam entering through the opening 8, to the interior of the various pipes. The chamber is secured on a common steam-distributing pipe and is retained on the same by means of bolts extending through holes in the lugs 9. The said chamber is provided with a cover 10 soldered fast onto the outside of the chamber, in order to facilitate soldering of the pipes in the inner side of the chamber. At their other ends, not shown in the drawing, the pipes 1, 2 and 3 are also inserted into a similar chamber for the collection of water of condensation or steam.

Inserted between the pipes 1 and 2, and 2 and 3 respectively, are corrugated plates 11 which are soldered onto the flattened pipes at the points of contact between the plates and pipes. Soldered onto the outside of the outer pipes 1 and 3 are corrugated plates 13. The height of these plates is smaller, the same being preferably half as high as the plates 11. In a modified embodiment, the outer flat pipes may be located near the sides of the chamber 7, and, in comparison with the other pipes, they have a smaller, preferably half as great a sectional area, while lacking plates soldered onto their outer plane surfaces.

In this case, the plates 11 are soldered fast to both of the pipes they touch, but need only be soldered to one of the pipes; moreover, they may be of a smaller height, in which case two corrugated plates may be inserted between two adjacent flat pipes, one plate being soldered to each pipe. The soldered plates, whether corrugated or shaped in some other manner, have a greater height than the flat pipes, as will be seen from Fig. 1, whereby an increased cooling surface is obtained on the air side.

The flat pipes 1, 2 and 3, together with the corrugated plates soldered thereto and with the appertaining distributing or collecting chamber according to Figs. 1 and 2, form one group; a greater number of such groups arranged besides each other constitute a cooler which is particularly suitable for locomotive condensers.

The inserted plates 11 and 13 may have any suitable form, provided they promote cooling of the air by the elements and the passage of the air about the flat pipes. Also, each group may consist of a greater number of flat pipes, if desired with some other mutual distance than that shown.

In a cooler of the described type, the surface in contact with the circulating air may be doubled, counted per unit of volume, in relation to the constructions as previously known, while the surface in contact with the circulating air may be made 7-8 times larger than the surface in contact with water or steam. The combined surface of the plates 11 alone should be at least four times as large as the inner surfaces of the flattened pipes.

In the same manner, such dimensions are preferably selected for the pipes and the intervening plates that the surface in contact with the circulating air will be at least 5 square meters, counted per cubic meter of the space occupied by the groups, while at least 55%, preferably 70-75% of the front area of the groups constitute channels for air. Here, front area involves the total area directed against the entering stream of air.

It is also possible to increase the free area for the passage of the cooling air by 40% as compared with previously known constructions, without the stability of the structure being jeopardized. Consequently, as the capacity of a cooler on the principle of the present invention is materially increased, the cooler may be built directly as a locomotive condenser, without special means having to be resorted to for the accumulation of heat with a higher load on the steam plants of the locomotive.

What we claim is:—

1. A cooler or condenser comprising pipes of flattened shape for the medium to be condensed, corrugated plates interposed between said pipes forming channels for circulating cooling air substantially at right angles to the longitudinal direction of said pipes, said pipes collected in groups, the ends of said pipes inserted in and connected with distributing or collecting chambers for the medium to be condensed or for the condensed medium, said corrugated plates extending with their corrugations from one of said pipes to the adjacent pipe, the outermost pipes of each of said groups provided on their external sides with corrugated plates of substantially half the height as the distance between two adjacent pipes in said groups.

2. A cooler or condenser comprising pipes of flattened shape for the medium to be condensed, corrugated plates interposed between said pipes forming channels for circulating cooling air substantially at right angles to the longitudinal direction of said pipes, said pipes collected in groups, the ends of said pipes inserted in and connected with distributing or collecting chambers for the medium to be condensed or for the condensed medium, said corrugated plates extending with their corrugations from one of said pipes to the adjacent pipe, the outermost pipes of each of said groups provided on their external sides with corrugated plates of substantially half the height as the distance between two adjacent pipes in said groups, and means for metallically uniting said corrugated plates and said pipes.

3. Arrangement according to claim 1, characterized by the fact that the outermost pipes of each group have a cross-sectional area of substantially half the size as the cross-sectional area of the other pipes in said group.

In testimony whereof we have signed this specification.

ALF LYSHOLM.
GUNNAR CEDERSTRAND.